US012608869B2

(12) United States Patent
Nan et al.

(10) Patent No.: US 12,608,869 B2
(45) Date of Patent: Apr. 21, 2026

(54) LIVE VIDEO BASED ON MOTION TRACKING AND ANIMATION OF FOREARM

(71) Applicant: BEIJING ZITIAO NETWORK TECHNOLOGY CO., LTD., Beijing (CN)

(72) Inventors: Tianjiao Nan, Beijing (CN); Han Cheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 203 days.

(21) Appl. No.: 18/551,308

(22) PCT Filed: Apr. 11, 2022

(86) PCT No.: PCT/CN2022/086052
§ 371 (c)(1),
(2) Date: Sep. 19, 2023

(87) PCT Pub. No.: WO2022/252823
PCT Pub. Date: Dec. 8, 2022

(65) Prior Publication Data
US 2024/0355027 A1 Oct. 24, 2024

(30) Foreign Application Priority Data

May 31, 2021 (CN) .......................... 202110598989.0

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/246* (2017.01); *G06T 7/73* (2017.01); *G06T 19/20* (2013.01);
(Continued)

(58) Field of Classification Search
None
See application file for complete search history.

(56) References Cited

U.S. PATENT DOCUMENTS

2004/0196301 A1* 10/2004 Isner ....................... G06T 13/40
345/653
2007/0172797 A1 7/2007 Hada et al.
(Continued)

FOREIGN PATENT DOCUMENTS

CN 107248195 A 10/2017
CN 109453509 A 3/2019
(Continued)

OTHER PUBLICATIONS

Fechteler, Philipp, et al. "Real-time avatar animation with dynamic face texturing." 2016 IEEE International Conference on Image Processing (ICIP). IEEE, 2016. (Year: 2016).*

(Continued)

*Primary Examiner* — Zhengxi Liu
(74) *Attorney, Agent, or Firm* — Astute IP Law Group

(57) ABSTRACT

The method includes acquiring first feature data of a physical object in real time, where the physical object includes a torso, a main arm, an elbow joint, and a forearm, the first feature data is configured for representing rotation angles of multiple parts of the forearm around an axial direction, and the rotation angles of the multiple parts of the forearm around the axial direction are positively correlated with distances from the multiple parts of the forearm to the elbow joint of the physical object; controlling rotation angles of (Continued)

multiple parts of the forearm skin of a virtual model around an axis direction based on the first feature data acquired in real time, where the rotation angles of the multiple parts of the forearm skin around the axial direction are positively correlated with distances from the multiple parts of the forearm skin to the elbow joint of the virtual model; and generating the image frame of the live video according to the virtual model and the rotation angles of the multiple parts of the forearm skin of the virtual model around the axis direction.

18 Claims, 4 Drawing Sheets

(51) Int. Cl.

| | | |
|---|---|---|
| *G06T 7/73* | (2017.01) | |
| *G06T 19/20* | (2011.01) | |
| *H04N 21/2187* | (2011.01) | |
| *H04N 21/81* | (2011.01) | |

(52) U.S. Cl.
CPC ..... *H04N 21/2187* (2013.01); *H04N 21/8146* (2013.01); *G06T 2207/30201* (2013.01); *G06T 2207/30204* (2013.01); *G06T 2219/2016* (2013.01)

(56) References Cited

U.S. PATENT DOCUMENTS

| | | | | |
|---|---|---|---|---|
| 2007/0260984 | A1* | 11/2007 | Marks | A63F 13/65 |
| | | | | 715/706 |
| 2008/0100622 | A1* | 5/2008 | Gordon | H04N 23/40 |
| | | | | 345/473 |
| 2016/0086500 | A1* | 3/2016 | Kaleal, III | A61B 5/20 |
| | | | | 434/257 |
| 2017/0256086 | A1* | 9/2017 | Park | G06T 13/40 |
| 2021/0042981 | A1 | 2/2021 | Bisceglio et al. | |
| 2021/0150806 | A1 | 5/2021 | Guler et al. | |

FOREIGN PATENT DOCUMENTS

| | | | |
|---|---|---|---|
| CN | 110557625 | A | 12/2019 |
| CN | 111161335 | A | 5/2020 |
| CN | 210955198 | U | 7/2020 |
| CN | 113365085 | A | 9/2021 |

OTHER PUBLICATIONS

Autodesk, "Rotate Wrist and Have Forearm Twist Automatically (CAT Rig)," published in 2019, retrieved from https://forums.autodesk.com/t5/3ds-max-animation-and-rigging/rotate-wrist-and-have-forearm-twist-automatically-cat-rig/td-p/8986259 on Aug. 14, 2025 (Year: 2019).*

Taylor, "How to Rig in Maya: Joints & Skinning", 2016. (Year: 2016).*

International Search Report (with English translation) and Written Opinion issued in PCT/CN2022/086052, dated Jun. 24, 2022, 8 pages provided.

Office Action issued in corresponding Chinese Application No. 202110598989.0, dated Jun. 15, 2022, with machine translation.

* cited by examiner

| Acquire first feature data of a physical object in real time | ~S101 |

↓

| Control the rotation angles of multiple parts of the forearm skin of a virtual model around an axis direction based on the first feature data acquired in real time | ~S102 |

↓

| Generate the image frame of a live video according to the virtual model | ~S103 |

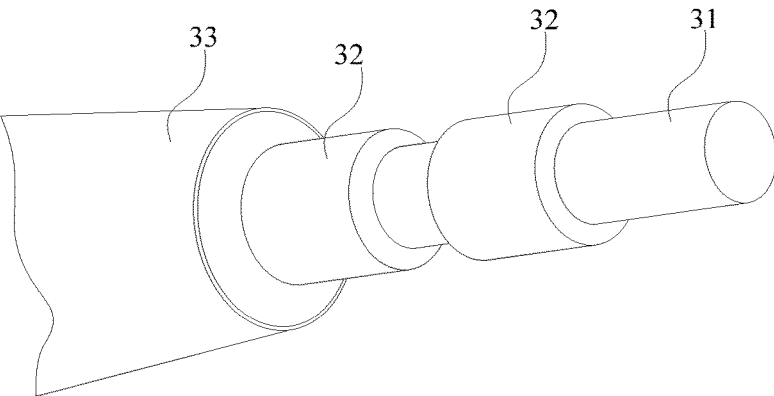

FIG. 3

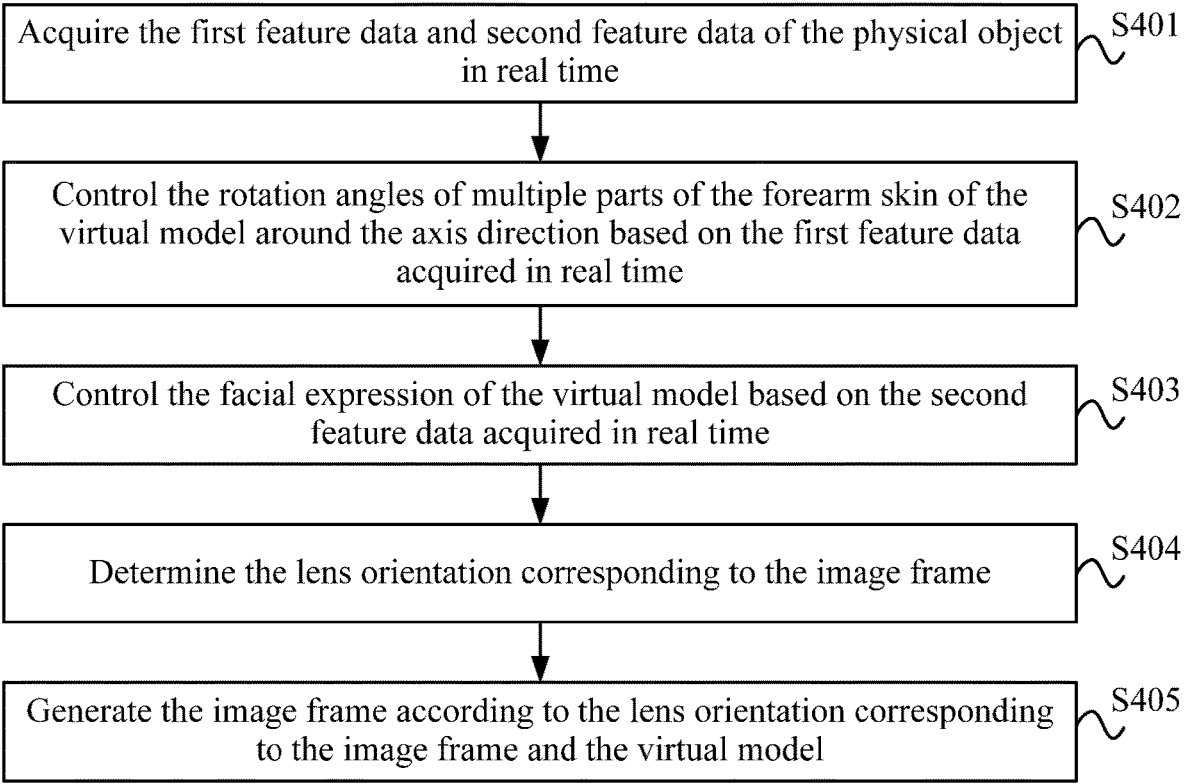

| Acquire the first feature data and second feature data of the physical object in real time | S401 |

↓

| Control the rotation angles of multiple parts of the forearm skin of the virtual model around the axis direction based on the first feature data acquired in real time | S402 |

↓

| Control the facial expression of the virtual model based on the second feature data acquired in real time | S403 |

↓

| Determine the lens orientation corresponding to the image frame | S404 |

↓

| Generate the image frame according to the lens orientation corresponding to the image frame and the virtual model | S405 |

FIG. 4

LIVE VIDEO BASED ON MOTION TRACKING AND ANIMATION OF FOREARM

CROSS-REFERENCES TO RELATED APPLICATIONS

This is a National Stage Application, filed under 35 U.S.C. 371, of International Patent Application No. PCT/CN2022/086052, filed on Apr. 11, 2022, which is based on and claims priority to Chinese Patent Application No. 202110598989.0 filed with the China National Intellectual Property Administration (CNIPA) on May 31, 2021, the disclosure of which is incorporated herein by reference in its entirety.

TECHNICAL FIELD

The present application relates to the field of video processing technology, for example, a method and apparatus for generating a live video.

BACKGROUND

In recent years, with the development of streaming media technology and the rapid growth of a network bandwidth, a live service is becoming more and more popular, and a live platform becomes one of the most popular entertainment media nowadays.

With the enrichment of live forms, a virtual live method is proposed in the related art. Virtual live streaming synchronizes the action of a physical object to a virtual model in real time by 3D modeling and real-time action capture, so that an anchor-side user live streams through the image of the virtual model, thereby greatly improving the flexibility of the live streaming. In the related art, the action of a physical object is synchronized to a virtual model in the following manner. The action of the physical object is transferred to the virtual model by simple redirection technology. However, the action synchronization method can only synchronize the overall posture of the virtual model with the physical object and cannot synchronize action details. As a result, the action of the virtual model in a live video is unnatural.

SUMMARY

The present application provides a method and apparatus for generating a live video to avoid an unnatural action of a virtual model in a live video generated by a virtual live method in the related art.

In a first aspect, an embodiment of the present application provides a method for generating a live video. The method includes the steps below:

First feature data of a physical object is acquired in real time. The physical object includes a torso, a main arm connected to the torso by a shoulder joint, and a forearm connected to the main arm by an elbow joint. The first feature data is configured for representing rotation angles of multiple parts of the forearm around an axial direction. The rotation angles of the multiple parts of the forearm around the axial direction are positively correlated with distances from the multiple parts of the forearm to the elbow joint of the physical object.

Rotation angles of multiple parts of the forearm skin of a virtual model around an axis direction are controlled based on the first feature data acquired in real time. The virtual model includes a torso, a main arm connected to the torso by a shoulder joint, and a forearm connected to the main arm by an elbow joint. The forearm skin covers the outer surface of the forearm of the virtual model. The rotation angles of the multiple parts of the forearm skin around the axial direction are positively correlated with distances from the multiple parts of the forearm skin to the elbow joint of the virtual model.

The image frame of the live video is generated according to the virtual model and the rotation angles of the multiple parts of the forearm skin of the virtual model around the axis direction.

In a second aspect, an embodiment of the present application provides an apparatus for generating a live video. The apparatus includes an acquisition unit, a processing unit, and a generation unit. The acquisition unit is configured to acquire the first feature data of the physical object in real time. The physical object includes a torso, a main arm connected to the torso by a shoulder joint, and a forearm connected to the main arm by an elbow joint. The first feature data is configured for representing the rotation angles of multiple parts of the forearm around the axial direction. The rotation angles of the multiple parts of the forearm around the axial direction are positively correlated with the distances from the multiple parts of the forearm to the elbow joint of the physical object.

The processing unit is configured to control the rotation angles of multiple parts of the forearm skin of the virtual model around the axis direction based on the first feature data acquired in real time. The virtual model includes a torso, a main arm connected to the torso by a shoulder joint, and a forearm connected to the main arm by an elbow joint. The forearm skin covers the outer surface of the forearm of the virtual model. The rotation angles of the multiple parts of the forearm skin around the axial direction are positively correlated with the distances from the multiple parts of the forearm skin to the elbow joint of the virtual model.

The generation unit is configured to generate the image frame of the live video according to the virtual model and the rotation angles of the multiple of parts of the forearm skin of the virtual model around the axis direction.

In a third aspect, an embodiment of the present application provides an electronic device. The electronic device includes a memory and a processor. The memory is configured to store a computer program. When the processor is configured to invoke the computer program, the processor executes the method for generating a live video described in the implementation of the first aspect.

In a fourth aspect, an embodiment of the present application provides a computer-readable storage medium. The storage medium stores a computer program. When executing the computer program, a processor performs the method for generating a live video described in the implementation of the first aspect.

In a fifth aspect, an embodiment of the present application provides a computer program product. When the computer program product operates on a computer, the computer performs the method for generating a live video described in the implementation of the first aspect.

BRIEF DESCRIPTION OF DRAWINGS

The drawings, which are incorporated in and constitute a part of the description, illustrate embodiments consistent with the present application and serve to explain the principles of the present application together with the description.

FIG. 3 is a diagram illustrating the structure of the forearm of a virtual model according to an embodiment of the present application.

FIG. 4 is flowchart two of the steps of a method for generating a live video according to an embodiment of the present application.

DETAILED DESCRIPTION

Figure 1:
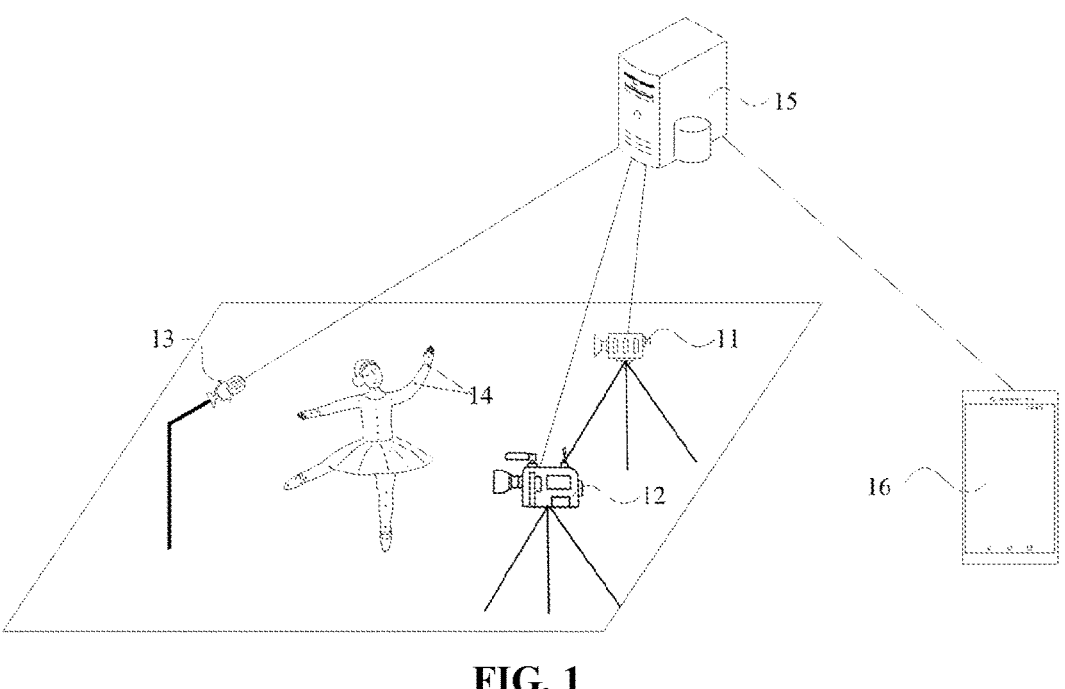
FIG. 1 is a diagram of the application scenario of a method for generating a live video according to an embodiment of the present application.

Solutions of the present application are further described below. It is to be noted that if not in collision, embodiments of the present application and features in the embodiments may be combined with each other.

Details are set forth below to facilitate a thorough understanding of the present application. However, the present application may be implemented by other embodiments different from the embodiments described herein. Apparently, the embodiments in the description are part, not all, of the embodiments of the present application.

The terms such as "first" and "second" in the description and claims of the present application are used to distinguish between synchronized objects, rather than to describe a specific order of objects. For example, a first correspondence and a second correspondence are used to distinguish different correspondences, rather than to describe the specific order of a correspondence.

In the embodiments of the present application, words "exemplary" or "for example" are used to indicate as examples, illustrations, or explanations. In the embodiments of the present application, any embodiment or design described as "exemplary" or "for example" is not to be interpreted as preferred or advantageous over other embodiments or designs. Specifically, the use of words such as "exemplary" or "for example" is intended to present related concepts in a related manner. In addition, in the description of the embodiments of the present application, unless otherwise noted, "a plurality of" means two or more.

The term "and/or" in the present application is used to describe the association between associated objects and indicates three relations, for example, A and/or B may indicate the presence of A alone, the presence of both A and B, and the presence of B alone.

Firstly, the scenario architecture applied to the method for generating a live video provided by the embodiments of the present application is described below. For example, referring to FIG. 1, the scenario architecture applied to the method for generating a live video provided by the embodiments of the present application includes a tracking device 11, a depth image acquisition device 12, an audio recording device 13, a tracking mark 14 disposed on a physical object, a live server 15, and a terminal device 16. The tracking device 11, the image acquisition device 12, the audio recording device 13, and the terminal device 16 are all interconnected with the live server 15. The tracking device 11 is configured to acquire the position information of the tracking mark 14 disposed on the physical object in real time and send the position information of the tracking mark 14 to the live server 15. The depth image acquisition device 12 is configured to acquire the depth image of the face of the physical object in real time and send the depth image of the face of the physical object to the live server 15. The audio recording device 13 is configured to record the ambient sound of the space where the physical object is located and send the recorded ambient sound to the live server 15. The live server 15 is configured to generate a live video according to the position information of the tracking mark 14 sent by the tracking device 11, the facial depth image of the physical object sent by the depth image acquisition device 12, and the audio data sent by the audio recording device 13 and send the generated live video to the terminal device 16. The terminal device 16 is configured to play the live video sent by the live server 15 on a live interface. The terminal device 16 may be terminal devices, such as a mobile phone, a tablet computer, a notebook computer, an ultra-mobile personal computer (UMPC), a netbook, a personal digital assistant (PDA), a smart watch, and a smart bracelet. Alternatively, the terminal device may also be other types of terminal devices. The live server 15 may be any form of server. In the embodiments of the present application, the types of the tracking device 11, the depth image acquisition device 12, and the audio recording device 13 are not limited, as long as corresponding functions can be implemented.

It is to be noted that description is given with reference to FIG. 1 by using an example in which the tracking device 11, the depth image acquisition device 12, and the audio recording device 13 are independent devices. However, the embodiments of the present application are not limited thereto. On the basis of the preceding embodiment, in the embodiments of the present application, two or all of the tracking device 11, the depth image acquisition device 12, and the audio recording device 13 in this embodiment of the present application may be integrated into the same physical device. For example, the depth image acquisition device 12 and the audio recording device 13 may also be integrated in the same depth camera.

Figure 2:
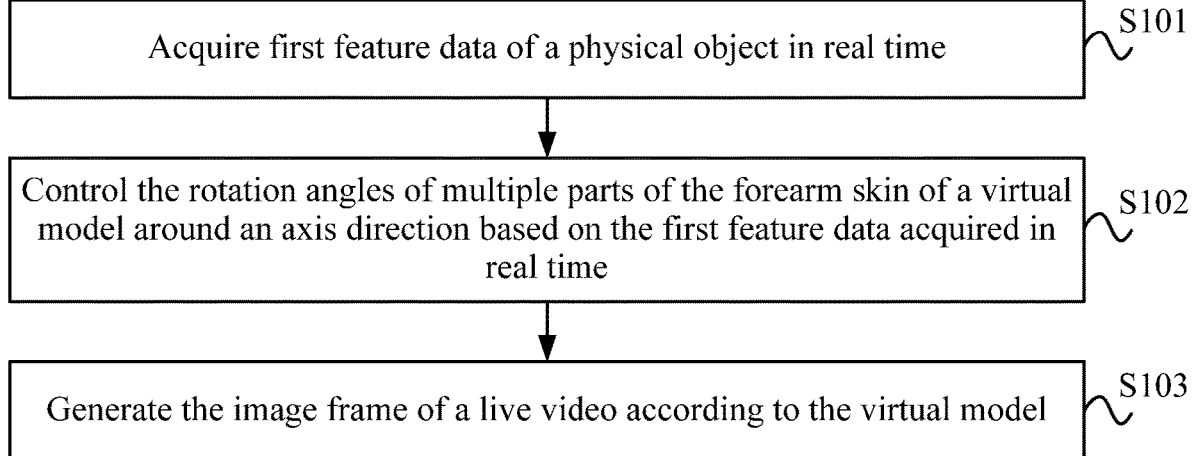
FIG. 2 is flowchart one of the steps of a method for generating a live video according to an embodiment of the present application.

In an implementation, an embodiment of the present application provides a method for generating a live video. Referring to FIG. 2, the method for generating a live video includes the steps S201 to S203 below:

In S201, first feature data of a physical object is acquired in real time.

The physical object includes a torso, a main arm connected to the torso by a shoulder joint, and a forearm connected to the main arm by an elbow joint. The first feature data is configured for representing rotation angles of multiple parts of the forearm around an axial direction. The rotation angles of the multiple parts of the forearm around the axial direction are positively correlated with distances from the multiple parts of the forearm to the elbow joint of the physical object.

For example, the physical object in this embodiment of the present application may be a human, a primate, and a robot. This is not limited in this embodiment of the present application.

In this embodiment of the present application, the rotation angles of the multiple parts of the forearm around the axial direction are positively correlated with distances from the multiple parts of the forearm to the elbow joint of the physical object, which refers to the case where for any two parts on the forearm, if a second part on the forearm is closer to the elbow joint than a first part on the forearm, the rotation angle of the second part around the axis direction is less than or equal to the rotation angle of the first part around the axis direction: and if a second part on the forearm is farther from the elbow joint than the first part on the forearm, the rotation angle of the second part around the axis direction is greater than or equal to the rotation angle of the first part around the axis direction.

For example, the axial direction refers to an extension direction along the forearm starting from the elbow joint.

In S202, rotation angles of multiple parts of the forearm skin of a virtual model around an axis direction are controlled based on the first feature data acquired in real time.

The virtual model includes a torso, a main arm connected to the torso by a shoulder joint, and a forearm connected to the main arm by an elbow joint. The forearm skin covers the outer surface of the forearm of the virtual model. The rotation angles of the multiple parts of the forearm skin around the axial direction are positively correlated with distances from the multiple parts of the forearm skin to the elbow joint of the virtual model.

For example, the first feature data may be transferred to the forearm bone of the virtual model by redirection, and the forearm skin of the virtual model is driven to rotate by the forearm bone of the virtual model, so that the rotation angles of multiple parts of the forearm skin of the virtual model around the axis direction are controlled based on the first feature data acquired in real time.

In an example embodiment of the embodiments of the present application, referring to FIG. 3, the forearm of the virtual model includes a main bone 31, multiple segments of additional bones 32 socketing on the main bone 31, and the forearm skin 33 covering the multiple segments of additional bones 32.

The preceding step S202 (the rotation angles of multiple parts of the forearm skin of the virtual model around the axis direction are controlled based on the first feature data acquired in real time) includes the step below:

At least one of the multiple segments of additional bones 32 is controlled to rotate around the main bone 31 based on the first feature data acquired in real time to drive the forearm skin 33 to rotate around the axial direction, thereby controlling the rotation angle of the forearm skin around the axial direction.

The rotation angles of the multiple additional bones around the main bone are positively correlated with distances from the multiple additional bones to the elbow joint of the virtual model.

In S203, the image frame of the live video is generated according to the virtual model and the rotation angles of the multiple parts of the forearm skin of the virtual model around the axis direction.

In the method for generating a live video provided by this embodiment of the present application, first, the first feature data configured for representing the rotation angles of multiple parts of the forearm of the physical object around the axial direction is acquired. Then the rotation angles of multiple parts of the forearm skin of the virtual model around the axis direction are controlled based on the first feature data acquired in real time. Finally, the image frame of the live video is generated according to the virtual model and the rotation angles of the multiple parts of the forearm skin of the virtual model around the axis direction. Since in this embodiment of the present application, the acquired rotation angles of the multiple parts of the forearm of the physical object around the axial direction are positively correlated with the distances from the multiple parts of the forearm to the elbow joint of the physical object, when the rotation angles of multiple parts of the forearm skin of the virtual model around the axis direction are controlled based on the first feature data, the rotation angles of the multiple parts of the forearm skin of the virtual model around the axial direction are positively correlated with the distances from the multiple parts of the forearm skin to the elbow joint of the virtual model. Thus, in this embodiment of the present application, the action of the forearm of the physical object may be synchronized to the virtual model in more detail, so that the action of the virtual model in a live video is more natural.

In the case where the forearm of the physical object is obstructed, the image frame of the live video may be generated only according to the virtual model without controlling the rotation angle of the forearm skin of the virtual model.

As the extension and refinement of the preceding embodiment, an embodiment of the present application provides another method for generating a live video. Referring to FIG. 4, the method for generating a live video includes the steps S401 to S405 below:

In 401, the first feature data and second feature data of the physical object are acquired in real time. The physical object includes a torso, a main arm connected to the torso by a shoulder joint, and a forearm connected to the main arm by an elbow joint. The first feature data is configured for representing the rotation angles of multiple parts of the forearm around the axial direction. The rotation angles of the multiple parts of the forearm around the axial direction are positively correlated with the distances from the multiple parts of the forearm to the elbow joint of the physical object. The second feature data is configured for representing the facial expression of the physical object.

For example, in the preceding step S401, the implementation of acquiring the first feature data of the physical object in real time may include the steps 1 and 2 below:

In step 1, the position information of multiple tracking marks disposed on the forearm of the physical object is acquired in real time.

In step 2, the first feature data of the physical object is acquired in real time according to the position information of the multiple tracking marks.

For example, in the preceding step S401, the implementation of acquiring the second feature data of the physical object in real time may include the steps a and b below.

In step a, an image acquisition device performs image acquisition on the physical object, and the face image of the physical object is acquired in real time.

In step b, the second feature data of the physical object is extracted based on the face image of the physical object acquired in real time.

In S402, the rotation angles of multiple parts of the forearm skin of the virtual model around the axis direction are controlled based on the first feature data acquired in real time.

The virtual model includes a torso, a main arm connected to the torso by a shoulder joint, and a forearm connected to the main arm by an elbow joint. The forearm skin covers the outer surface of the forearm of the virtual model. The rotation angles of the multiple parts of the forearm skin around the axial direction are positively correlated with the distances from the multiple parts of the forearm skin to the elbow joint of the virtual model.

In S403, the facial expression of the virtual model is controlled based on the second feature data acquired in real time.

In an example embodiment of the embodiments of the present application, an implementation of the preceding step S403 (the facial expression of the virtual model is controlled based on the second feature data acquired in real time) includes the steps I and II below.

In step I, the second feature data is input into an expression algorithm model, and an expression drive parameter output by the expression algorithm model is acquired.

The expression algorithm model is a model acquired by training of a preset algorithm model based on sample data. The sample data includes sample expression data of the physical object and an expression drive parameter corresponding to the sample expression data.

For example, the preset algorithm model may be a machine learning algorithm model such as a deep learning neural network model and a convolutional neural network model. The specific type of the preset algorithm model is not limited in this embodiment of the present application.

In step II, the face of the virtual model is driven based on the expression drive parameter to generate the facial expression of the virtual model.

In S404, the lens orientation corresponding to the image frame is determined.

The lens orientation is configured for representing the position relationship between the virtual lens corresponding to the image frame and the virtual model.

It is to be noted that there may be one or more lens orientations corresponding to the image frame. When the image frame corresponds to multiple lens orientations, the image frame may be spliced from images corresponding to the multiple lens orientations.

In an example embodiment of the embodiments of the present application, an implementation of the preceding step S404 (the lens orientation corresponding to the image frame is determined) is below:

In response to a user's operation on a lens control, the lens orientation corresponding to the image frame is determined. The lens control is configured to select the lens orientation.

For example, the user in the preceding embodiment may be an anchor-side user or an audience-side user. The anchor-side user and/or the audience-side user may select the lens orientation corresponding to a to-be-generated image frame by operating the lens control.

In the preceding embodiment, a user may select the lens orientation corresponding to each image frame of the live video, so that the user may control the live video to be presented as a video shot by a lens such as a track lens, a handheld lens, and an aerial lens according to requirements, thereby enriching user selection and improving user experience.

In an example embodiment of the embodiments of the present application, another implementation of the preceding step S404 (the lens orientation corresponding to the image frame is determined) is below:

The lens orientation corresponding to the image frame is determined based on the first feature data and a preset rule.

That is, the lens orientation corresponding to each image frame of the live video may be automatically adjusted according to the first feature data and the preset rule.

For example, the preset rule may be that when the rotation angle of the designated part of the forearm of the physical object around the axial direction is a preset angle, the determined lens orientation corresponding to the image frame is determined as the lens orientation corresponding to the preset angle. For example, the lens orientation corresponding to the to-be-generated image frame may be switched to a face close-up lens according to the first feature data, or the lens orientation corresponding to the to-be-generated image frame may be switched to a panoramic lens according to the first feature data.

In S405, the image frame is generated according to the lens orientation corresponding to the image frame and the virtual model.

It is to be noted that in the preceding embodiment, the method for generating a live video is performed in real time. Thus, each time the first feature data, the second feature data, and the lens orientation corresponding to an image frame are acquired, the image frame is generated according to the first feature data, the second feature data, and the lens orientation corresponding to the image frame, and the first feature data, the second feature data, and the lens orientation corresponding to the next image frame are acquired at the same time when the image frame is generated.

In the method for generating a live video provided by this embodiment of the present application, first, the first feature data configured for representing the rotation angles of multiple parts of the forearm of the physical object around the axial direction is acquired. Then the rotation angles of multiple parts of the forearm skin of the virtual model around the axis direction are controlled based on the first feature data acquired in real time. Finally, the image frame of the live video is generated according to the virtual model and the rotation angles of the multiple parts of the forearm skin of the virtual model around the axis direction. Since in this embodiment of the present application, the acquired rotation angles of the multiple parts of the forearm of the physical object around the axial direction are positively correlated with the distances from the multiple parts of the forearm to the elbow joint of the physical object, when the rotation angles of multiple parts of the forearm skin of the virtual model around the axis direction are controlled based on the first feature data, the rotation angles of the multiple parts of the forearm skin of the virtual model around the axial direction are positively correlated with the distances from the multiple parts of the forearm skin to the elbow joint of the virtual model. Thus, in this embodiment of the present application, the action of the forearm of the physical object may be synchronized to the virtual model in more detail, so that the action of the virtual model in the live video is more natural.

In an example embodiment of the embodiments of the present application, on the basis of any preceding embodiment, the method for generating a live video provided by this embodiment of the present application also includes the steps below:

An ambient sound in the space where the physical object is located is recorded, and ambient audio data is acquired.

The audio data of the live video is generated according to the ambient audio data.

For example, the audio data of the live video is generated according to the ambient audio data in the following manner: The ambient audio data is used as the audio data of the live video.

For example, the audio data of the live video is generated according to the ambient audio data in the following manner: The ambient audio data and preset audio data are fused to generate the audio data for the live video. For example, the ambient sound in the space where the physical object is located is recorded. The acquired ambient audio data is an unaccompanied audio. The acquired ambient audio data and accompanying music may be fused to generate the audio data of the live video.

Based on the same application concept, as an implementation of the preceding method, an embodiment of the present application provides an apparatus for generating a live video. The embodiment of the apparatus for generating a live video corresponds to the preceding method embodiment. For ease of reading, details in the preceding method embodiment are not described in this apparatus embodiment. However, it is clear that the apparatus for generating a live video in this embodiment can correspondingly implement all the content in the preceding method embodiment.

Figure 5:
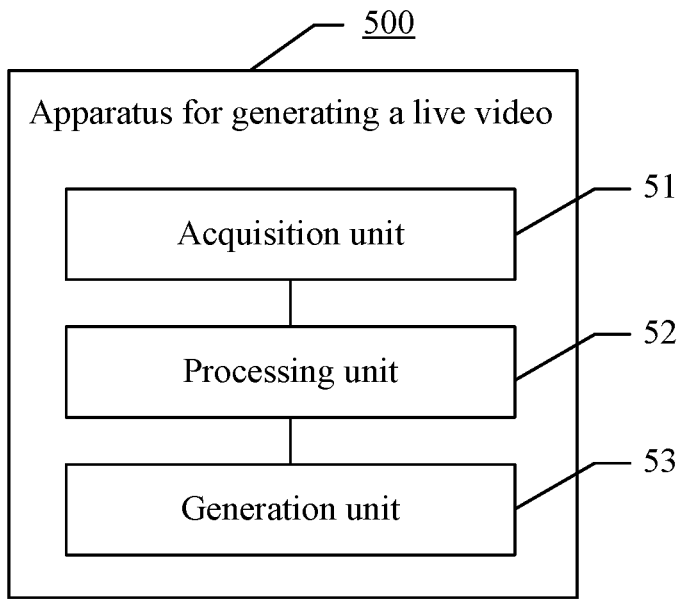
FIG. 5 is diagram one illustrating the structure of an apparatus for generating a live video according to an embodiment of the present application.

FIG. 5 is a diagram illustrating the structure of an apparatus for generating a live video according to an embodiment of the present application. As shown in FIG. 5, the apparatus 500 for generating a live video provided by this embodiment also includes an acquisition unit 51, a processing unit 52, and a generation unit 53.

The acquisition unit 51 is configured to acquire the first feature data of the physical object in real time. The physical object includes a torso, a main arm connected to the torso by a shoulder joint, and a forearm connected to the main arm by an elbow joint. The first feature data is configured for representing the rotation angles of multiple parts of the forearm around the axial direction. The rotation angles of the multiple parts of the forearm around the axial direction are positively correlated with the distances from the multiple parts of the forearm to the elbow joint of the physical object.

The processing unit 52 is configured to control the rotation angles of multiple parts of the forearm skin of the virtual model around the axis direction based on the first feature data acquired in real time. The virtual model includes a torso, a main arm connected to the torso by a shoulder joint, and a forearm connected to the main arm by an elbow joint. The forearm skin covers the outer surface of the forearm of the virtual model. The rotation angles of the multiple parts of the forearm skin around the axial direction are positively correlated with the distances from the multiple parts of the forearm skin to the elbow joint of the virtual model.

The generation unit 53 is configured to generate the image frame of the live video according to the virtual model and the rotation angles of the multiple of parts of the forearm skin of the virtual model around the axis direction.

In an example embodiment of the embodiments of the present application, the forearm of the virtual model includes a main bone, multiple segments of additional bones socketing on the main bone, and the forearm skin covering the multiple segments of additional bones.

The processing unit 52 is configured to control the rotation angle of at least one of the multiple segments of additional bones around the main bone based on the first feature data acquired in real time to control the rotation angle of the forearm skin around the axial direction.

Figure 6:
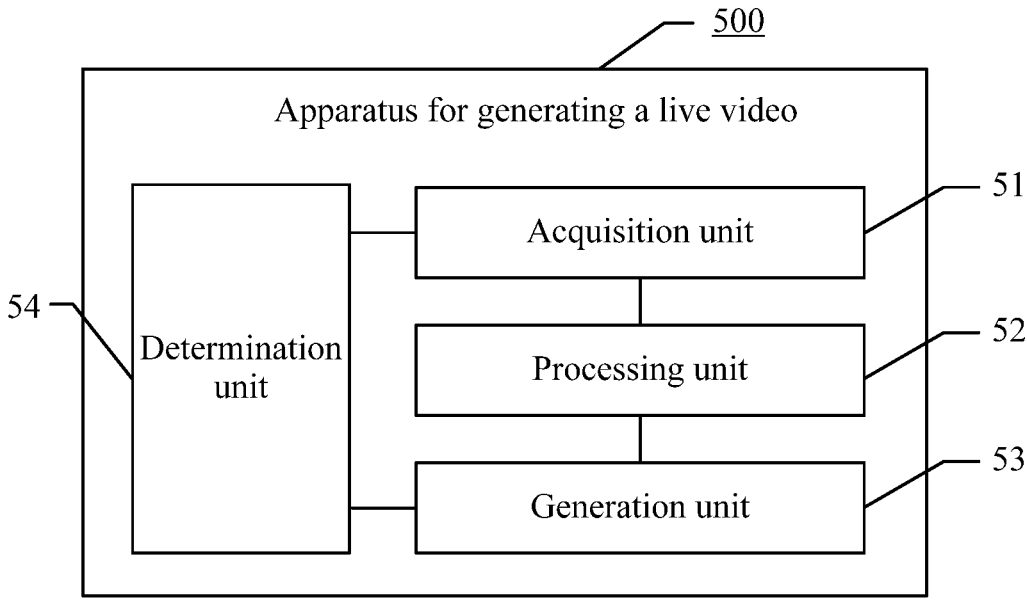
FIG. 6 is diagram two illustrating the structure of an apparatus for generating a live video according to an embodiment of the present application.

In an example embodiment of the embodiments of the present application, referring to FIG. 6, the apparatus 500 for generating a live video also includes a determination unit 54.

The determination unit 54 is configured to determine the lens orientation corresponding to the image frame. The lens orientation is configured for representing the position relationship between the virtual lens corresponding to the image frame and the virtual model.

The generation unit 53 is configured to generate the image frame according to the lens orientation corresponding to the image frame and the virtual model.

In an example embodiment of the embodiments of the present application, the determination unit 54 is configured to, in response to the user's operation on the lens control, determine the lens orientation corresponding to the image frame.

The lens control is configured to select the lens orientation.

In an example embodiment of the embodiments of the present application, the determination unit 54 is configured to determine the lens orientation corresponding to the image frame based on the first feature data and the preset rule.

In an example embodiment of the embodiments of the present application, the acquisition unit 51 is also configured to acquire the second feature data of the physical object in real time. The second feature data is configured for representing the facial expression of the physical object.

The processing unit 52 is also configured to control the facial expression of the virtual model based on the second feature data acquired in real time.

In an example embodiment of the embodiments of the present application, the processing unit 52 is configured to input the second feature data into the expression algorithm model, acquire the expression drive parameter output by the expression algorithm model, drive the face of the virtual model based on the expression drive parameter to generate the facial expression of the virtual model.

The expression algorithm model is the model acquired by training of the preset algorithm model based on the sample data. The sample data includes sample expression data of the physical object and an expression drive parameter corresponding to the sample expression data.

In an example embodiment of the embodiments of the present application, the acquisition unit 51 is configured to acquire the position information of multiple tracking marks disposed on the forearm of the physical object in real time and acquire the first feature data of the physical object in real time according to the position information of the multiple tracking marks.

In an example embodiment of the embodiments of the present application, the acquisition unit 51 is configured to perform image acquisition on the physical object by the image acquisition device, acquire the face image of the physical object in real time, and extract the second feature data of the physical object based on the face image of the physical object acquired in real time.

In an example embodiment of the embodiments of the present application, the acquisition unit 51 is also configured to record the ambient sound in the space where the physical object is located and acquire the ambient audio data.

The generation unit 53 is also configured to generate the audio data of the live video according to the ambient audio data.

The apparatus for generating a live video according to this embodiment may perform the method for generating a live video according to the preceding method embodiment. The implementation principle and the technical effect are similar, and the details are not repeated here.

Figure 7:
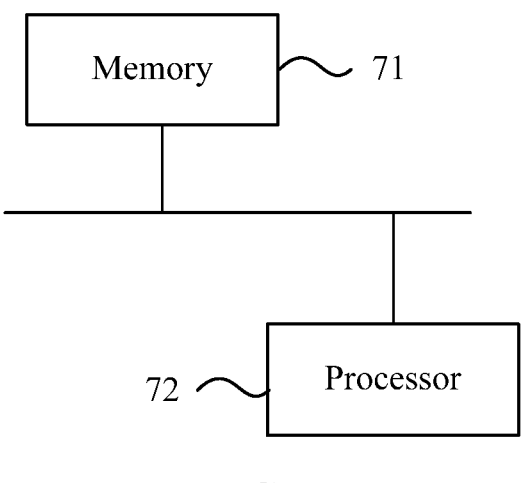
FIG. 7 is a diagram illustrating the hardware structure of an electronic device according to an embodiment of the present application.

Based on the same application concept, an embodiment of the present application provides an electronic device. FIG. 7 is a diagram illustrating the structure of an electronic device according to an embodiment of the present application. As shown in FIG. 7, the electronic device according to this embodiment includes a memory 71 and a processor 72. The memory 71 is configured to store a computer program. The processor 72 is configured to invoke the computer program, and at this time, a computer device implements the method for generating a live video according to the preceding method embodiment.

For example, the memory 71 may be configured to store software programs and various types of data. The memory 71 may mainly include a program storage area and a data storage area. The program storage area may store an operating system and at least one application program required for functions (such as a sound play back function and an image play back function). The data storage area may store data (such as audio data and a phone book) created according to the use of the mobile phone. In addition, the memory 71 may include a high-speed random access memory and may also include a nonvolatile memory, such as at least one click memory, flash memory or another nonvolatile solid-state memory.

The processor 72 is the control center of the electronic device, connects various parts of the entire electronic device by using various interfaces and lines, and executes the electronic device's various functions and data processing by running or executing software programs and/or modules stored in the memory 71 and invoking data stored in the memory 71 to control the electronic device integrally. The processor 72 may include one or more processing units.

In addition, it is to be understood that the electronic device provided in this embodiment of the present application may also include a radio frequency unit, a network module, an audio output unit, a receiving unit, a sensor, a display unit, a user receiving unit, an interface unit, and a power source. It should be understood by those skilled in the art that the structure of the electronic device described above does not limit the computer device, and the electronic device may include more or fewer components or may be configured by combining certain components or using different components. In this embodiment of the present application, the electronic device includes, but is not limited to, a mobile phone, a tablet computer, a notebook computer, a palmtop computer, an in-vehicle terminal, a wearable device, and a pedometer.

The radio frequency unit may be configured to receive and send signals during information reception or transmission or during the call. For example, the radio frequency unit receives downlink information of a base station and sends the downlink information to the processor 72. In addition, the radio frequency unit sends uplink data to the base station. Generally, the radio frequency unit includes, but is not limited to, an antenna, at least one amplifier, a transceiver, a coupler, a low noise amplifier, and a duplexer. In addition, the radio frequency unit may also communicate with the network and other devices through a wireless communication system.

The electronic device provides the user with wireless broadband Internet access through the network module. For example, the electronic device helps the user to send and receive emails, browse web pages, and access streaming media.

The audio output unit may convert the audio data received by the radio frequency unit or the network module or stored in the memory 71 into an audio signal and output as a sound. Moreover, the audio output unit may also provide audio output (such as call signal reception sound and message reception sound) related to the specific function performed by the electronic device. The audio output unit includes a speaker, a buzzer, and a receiver.

The receiving unit is configured to receive an audio or video signal. The receiving unit may include a graphics processing unit (GPU) and a microphone. The graphics processing unit processes the image data of static pictures or videos obtained by an image capture device (such as a camera) in a video capture mode or an image capture mode.

The processed image frame may be displayed on the display unit. The image frame processed by the graphics processing unit may be stored in the memory (or other storage media) or sent by the radio frequency unit or network module. The microphone may receive a sound and can process such sound into audio data.

The processed audio data may be converted into a format that may be sent to a mobile communication base station by the radio frequency unit for output in the case of a phone call mode. The electronic device also includes at least one sensor, such as a light sensor, a motion sensor, and other sensors. For example, the light sensor includes an ambient light sensor and a proximity sensor. The ambient light sensor may adjust the brightness of a display panel according to the brightness of the ambient light. The proximity sensor may turn off the display panel and/or backlight when the electronic device moves to an ear. As a type of motion sensor, an accelerometer sensor may detect the magnitude of acceleration in each direction (usually three axes). When in a stationary state, the accelerometer sensor may detect the magnitude and direction of gravity, may be configured to recognize the gesture (such as horizontal and vertical screen switching, related game, and magnetometer gesture calibration) of the electronic device, and vibrate to identify relevant functions (such as pedometer, tapping). Sensors may also include a fingerprint sensor, a pressure sensor, an iris sensor, a molecular sensor, a gyroscope, a barometer, a hygrometer, a thermometer, and an infrared sensor, and the details are not repeated here.

The display unit is configured to display information input by the user or information provided to the user. The display panel may be configured in the form of a liquid crystal display (LCD) and an organic light-emitting diode (OLED).

The user receiving unit may be configured to receive the input digital or character information and generate key signal input related to user settings and function control of the electronic device. For example, the user receiving unit includes a touch panel and other input devices. The touch panel, also referred to as a touch screen, may collect user's touch operations on or near the touch panel (for example, the user uses any suitable object or accessory such as a finger or a stylus to operate on or near the touch panel). The touch panel may include two parts: a touch detection apparatus and a touch controller. The touch detection apparatus detects the touch orientation of the user and a signal brought by the touch operation, and transmits the signal to the touch controller. The touch controller receives the touch information from the touch detection apparatus, converts the touch information into contact coordinates, sends the contact coordinates to the processor 72, and receives a command from the processor 72 and executes the command. In addition, the touch panel may be implemented in various types such as resistive-, capacitive-, infrared-, and surface acoustic wave-touch panel. In addition to the touch panel, the user receiving unit may also include other input devices. For example, other input devices may include, but are not limited to, a physical keyboard, a functional key (such as a volume control key and a switch key), a trackball, a mouse, and a lever, and the details are not repeated here.

For example, the touch panel may cover the display panel. When the touch panel detects a touch operation on or near the touch panel, the touch operation is transmitted to the processor 72 to determine a type of the touch event, and then the processor 72 provides a corresponding visual output on the display panel according to the type of the touch event. In general, the touch panel and the display panel are used as two separate components to implement the input and output functions of the electronic device. However, in some embodiments, the touch panel and the display panel may be integrated to implement the input and output functions of the electronic device. This is not limited in this embodiment.

The interface unit is an interface for connecting an external apparatus to the electronic device. For example, the external apparatus may include a wired or wireless headphone port, an external power supply (or battery charger) port, a wired or wireless data port, a memory card port, a port for connecting an apparatus having an identification module, an audio input/output (I/O) port, a video I/O port, and a headphone port. The interface unit may be configured to receive input (such as data information and power) from the external apparatus and transmit the received input to one or more elements in the electronic device or may be configured to transmit data between the electronic device and the external apparatus.

The electronic device may also include a power supply (such as a battery) that supplies power to multiple components. For example, the power supply may be logically connected to the processor 72 through a power supply management system to implement functions such as charging, discharging, and power management through the power supply management system.

An embodiment of the present application provides a computer-readable storage medium. The computer-readable storage medium stores a computer program. When executing the computer program, a computer device implements the method for generating a live video according to the preceding method embodiment.

An embodiment of the present application provides a computer program product. When the computer program product operates on a computer, the computer implements the method for generating a live video according to the preceding method embodiment.

It is to be understood by those skilled in the art that the embodiments of the present application may be provided as methods, systems, and computer program products. Therefore, the present application may use the form of completely hardware embodiments, completely software embodiments, or a combination of software and hardware embodiments. Moreover, the present application may use the form of a computer program product implemented on one or more computer-usable storage media that include computer-usable program codes. The computer-readable storage medium may be a non-transient computer-readable storage medium.

The computer-readable storage medium includes non-volatile, volatile, removable, and non-removable storage media. The storage medium may implement information storage using any method or technology. The information may be a computer-readable instruction, a data structure, a program module or other data. Examples of the computer storage medium include, but are not limited to, a phase-change memory (PRAM), a static random access memory (SRAM), a dynamic random access memory (DRAM), other types of random-access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic disk or other magnetic storage devices, or any other non-transmission medium capable of storing information that can be accessed by a computing device. As defined herein, the computer-readable media do not include non-transitory computer-readable media such as modulated data signals and carriers. It is to be noted that as used herein, term "comprise", "include", or any other variant thereof is intended to encompass a non-exclusive inclusion so that a process, method, article, or device that includes a series of elements not only includes the expressly listed elements but also includes other elements that are not expressly listed or are inherent to such a process, method, article, or device. In the absence of more restrictions, the elements defined by the statement "including a . . ." do not exclude the presence of additional identical elements in the process, method, article, or device that includes the elements.

What is claimed is:

1. A method for generating a live video comprises:
acquiring first feature data of a physical object in real time, wherein the physical object comprises a torso, a main arm connected to the torso by a shoulder joint, and a forearm connected to the main arm by an elbow joint, the first feature data is configured for representing rotation angles of a plurality of parts of the forearm around an axial direction, and the rotation angles of the plurality of parts of the forearm around the axial direction are positively correlated with distances from the plurality of parts of the forearm to the elbow joint of the physical object;
controlling rotation angles of a plurality of parts of a forearm skin of a virtual model around the axis direction based on the first feature data acquired in real time, wherein the virtual model comprises a torso, a main arm connected to the torso by a shoulder joint, and a forearm connected to the main arm by an elbow joint, the forearm skin covers an outer surface of the forearm of the virtual model, and the rotation angles of the plurality of parts of the forearm skin around the axial direction are positively correlated with distances from the plurality of parts of the forearm skin to the elbow joint of the virtual model; and
generating an image frame of the live video according to the virtual model and the rotation angles of the plurality of parts of the forearm skin of the virtual model around the axis direction;
wherein the forearm of the virtual model comprises a main bone, a plurality of segments of additional bones socketing on the main bone, and the forearm skin covering the plurality of segments of additional bones; and
controlling the rotation angles of the plurality of parts of the forearm skin of the virtual model around the axis direction based on the first feature data acquired in real time comprises:
controlling a rotation angle of at least one of the plurality of segments of additional bones around the main bone based on the first feature data acquired in real time to control a rotation angle of the forearm skin around the axial direction.

2. The method according to claim 1, wherein generating the image frame of the live video according to the virtual model and the rotation angles of the plurality of parts of the forearm skin of the virtual model around the axis direction comprises:
determining a lens orientation corresponding to the image frame, wherein the lens orientation is configured for representing a position relationship between a virtual lens corresponding to the image frame and the virtual model; and
generating the image frame according to the lens orientation corresponding to the image frame and the virtual model.

3. The method according to claim 2, wherein determining the lens orientation corresponding to the image frame comprises:

in response to a user's operation on a lens control, determining the lens orientation corresponding to the image frame, wherein the lens control is configured to select the lens orientation.

4. The method according to claim 2, wherein determining the lens orientation corresponding to the image frame comprises:

determining the lens orientation corresponding to the image frame based on the first feature data and a preset rule.

5. The method according to claim 1, further comprising:

acquiring second feature data of the physical object in real time, wherein the second feature data is configured for representing a facial expression of the physical object; and controlling a facial expression of the virtual model based on the second feature data acquired in real time.

6. The method according to claim 5, wherein controlling the facial expression of the virtual model based on the second feature data acquired in real time comprises:

inputting the second feature data into an expression algorithm model and acquiring an expression drive parameter output by the expression algorithm model, wherein the expression algorithm model is a model acquired by training of a preset algorithm model based on sample data, and the sample data comprises sample expression data of the physical object and an expression drive parameter corresponding to the sample expression data; and driving a face of the virtual model based on the expression drive parameter to generate the facial expression of the virtual model.

7. The method according to claim 5, wherein acquiring the second feature data of the physical object in real time comprises:

performing image acquisition on the physical object by an image acquisition device and acquiring a face image of the physical object in real time; and extracting the second feature data of the physical object based on the face image of the physical object acquired in real time.

8. The method according to claim 1, wherein acquiring the first feature data of the physical object in real time comprises:

acquiring position information of a plurality of tracking marks disposed on the forearm of the physical object in real time; and acquiring the first feature data of the physical object in real time according to the position information of the plurality of tracking marks.

9. The method according to claim 1, further comprising:

recording an ambient sound in space where the physical object is located and acquiring ambient audio data; and generating audio data of the live video according to the ambient audio data.

10. An electronic device, comprising a memory and a processor, wherein the memory is configured to store a computer program, and when the processor is configured to invoke the computer program, the electronic device implements a method for generating a live video, wherein the method for generating a live video comprises:

acquiring first feature data of a physical object in real time, wherein the physical object comprises a torso, a main arm connected to the torso by a shoulder joint, and a forearm connected to the main arm by an elbow joint, the first feature data is configured for representing rotation angles of a plurality of parts of the forearm around an axial direction, and the rotation angles of the plurality of parts of the forearm around the axial direction are positively correlated with distances from the plurality of parts of the forearm to the elbow joint of the physical object;

controlling rotation angles of a plurality of parts of a forearm skin of a virtual model around the axis direction based on the first feature data acquired in real time, wherein the virtual model comprises a torso, a main arm connected to the torso by a shoulder joint, and a forearm connected to the main arm by an elbow joint, the forearm skin covers an outer surface of the forearm of the virtual model, and the rotation angles of the plurality of parts of the forearm skin around the axial direction are positively correlated with distances from the plurality of parts of the forearm skin to the elbow joint of the virtual model; and generating an image frame of the live video according to the virtual model and the rotation angles of the plurality of parts of the forearm skin of the virtual model around the axis direction;

wherein the forearm of the virtual model comprises a main bone, a plurality of segments of additional bones socketing on the main bone, and the forearm skin covering the plurality of segments of additional bones; and controlling the rotation angles of the plurality of parts of the forearm skin of the virtual model around the axis direction based on the first feature data acquired in real time comprises:

controlling a rotation angle of at least one of the plurality of segments of additional bones around the main bone based on the first feature data acquired in real time to control a rotation angle of the forearm skin around the axial direction.

11. The electronic device according to claim 10, wherein generating the image frame of the live video according to the virtual model and the rotation angles of the plurality of parts of the forearm skin of the virtual model around the axis direction comprises:

determining a lens orientation corresponding to the image frame, wherein the lens orientation is configured for representing a position relationship between a virtual lens corresponding to the image frame and the virtual model; and generating the image frame according to the lens orientation corresponding to the image frame and the virtual model.

12. The electronic device according to claim 11, wherein determining the lens orientation corresponding to the image frame comprises:

in response to a user's operation on a lens control, determining the lens orientation corresponding to the image frame, wherein the lens control is configured to select the lens orientation.

13. The electronic device according to claim 11, wherein determining the lens orientation corresponding to the image frame comprises:

determining the lens orientation corresponding to the image frame based on the first feature data and a preset rule.

14. The electronic device according to claim 10, further comprising:

acquiring second feature data of the physical object in real time, wherein the second feature data is configured for representing a facial expression of the physical object; and controlling a facial expression of the virtual model based on the second feature data acquired in real time.

15. The electronic device according to claim 14, wherein controlling the facial expression of the virtual model based on the second feature data acquired in real time comprises:

inputting the second feature data into an expression algorithm model and acquiring an expression drive parameter output by the expression algorithm model, wherein the expression algorithm model is a model acquired by training of a preset algorithm model based on sample data, and the sample data comprises sample expression data of the physical object and an expression drive parameter corresponding to the sample expression data; and driving a face of the virtual model based on the expression drive parameter to generate the facial expression of the virtual model.

16. The electronic device according to claim 14, wherein acquiring the second feature data of the physical object in real time comprises:

performing image acquisition on the physical object by an image acquisition device and acquiring a face image of the physical object in real time; and extracting the second feature data of the physical object based on the face image of the physical object acquired in real time.

17. The electronic device according to claim 10, wherein acquiring the first feature data of the physical object in real time comprises:

acquiring position information of a plurality of tracking marks disposed on the forearm of the physical object in real time; and acquiring the first feature data of the physical object in real time according to the position information of the plurality of tracking marks.

18. A non-transitory computer-readable storage medium storing a computer program, wherein when executing the computer program, a computer device implements a method for generating a live video, wherein the method for generating a live video comprises:

acquiring first feature data of a physical object in real time, wherein the physical object comprises a torso, a main arm connected to the torso by a shoulder joint, and a forearm connected to the main arm by an elbow joint, the first feature data is configured for representing rotation angles of a plurality of parts of the forearm around an axial direction, and the rotation angles of the plurality of parts of the forearm around the axial direction are positively correlated with distances from the plurality of parts of the forearm to the elbow joint of the physical object;

controlling rotation angles of a plurality of parts of a forearm skin of a virtual model around the axis direction based on the first feature data acquired in real time, wherein the virtual model comprises a torso, a main arm connected to the torso by a shoulder joint, and a forearm connected to the main arm by an elbow joint, the forearm skin covers an outer surface of the forearm of the virtual model, and the rotation angles of the plurality of parts of the forearm skin around the axial direction are positively correlated with distances from the plurality of parts of the forearm skin to the elbow joint of the virtual model; and generating an image frame of the live video according to the virtual model and the rotation angles of the plurality of parts of the forearm skin of the virtual model around the axis direction;

wherein the forearm of the virtual model comprises a main bone, a plurality of segments of additional bones socketing on the main bone, and the forearm skin covering the plurality of segments of additional bones; and controlling the rotation angles of the plurality of parts of the forearm skin of the virtual model around the axis direction based on the first feature data acquired in real time comprises:

controlling a rotation angle of at least one of the plurality of segments of additional bones around the main bone based on the first feature data acquired in real time to control a rotation angle of the forearm skin around the axial direction.

* * * * *